United States Patent
Imboden et al.

(10) Patent No.: US 12,134,136 B2
(45) Date of Patent: Nov. 5, 2024

(54) SAWING TOOL, IN PARTICULAR SAW BLADE

(71) Applicant: Robert Bosch GmbH, Stuttgart (DE)

(72) Inventors: Martin Imboden, St. Niklaus (CH); Nathanael Brigger, Olten (CH); Milan Bozic, Luterbach (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/292,903

(22) PCT Filed: Nov. 8, 2019

(86) PCT No.: PCT/EP2019/080701
§ 371 (c)(1),
(2) Date: May 11, 2021

(87) PCT Pub. No.: WO2020/099267
PCT Pub. Date: May 22, 2020

(65) Prior Publication Data
US 2022/0001471 A1  Jan. 6, 2022

(30) Foreign Application Priority Data
Nov. 14, 2018 (DE) ...................... 10 2018 219 441.6

(51) Int. Cl.
*B23D 61/12* (2006.01)
*B23D 61/00* (2006.01)

(52) U.S. Cl.
CPC ......... *B23D 61/123* (2013.01); *B23D 61/006* (2013.01); *B23D 61/128* (2013.01)

(58) Field of Classification Search
CPC .. B23D 61/006; B23D 61/021; B23D 61/123; B23D 61/128; B23D 61/121;
(Continued)

(56) References Cited

U.S. PATENT DOCUMENTS 452,391 A * 5/1891 Rothgery ............. B23D 61/121
83/848
622,536 A * 4/1899 Prouty ................. B23D 61/121
83/850
(Continued)

FOREIGN PATENT DOCUMENTS

CN 107921655 A 4/2018
DE 2053090 A1 * 10/1972
(Continued)

OTHER PUBLICATIONS

Dictoary.com, Transverse, n.d., "transverse," avaiable at https://www.dictionary.com/browse/transverse, on Dec. 14, 2022.*
(Continued)

*Primary Examiner* — Jonathan G Riley
(74) *Attorney, Agent, or Firm* — Maginot, Moore & Beck LLP

(57) ABSTRACT

A sawing tool, in particular a saw blade, includes: at least one connection region, in particular a shaft, for forming a connection to a tool holder of a hand-held power tool; at least one main body, in particular a carrier, which is connected to the connection region and is designed in one piece; at least one set of saw teeth which is located on the main body; and a plurality of reduction grooves which are located on the main body, in particular introduced into the main body by removing material, and which have a main extension running transversely to a cutting edge of the saw teeth. The reduction grooves extend at least over more than 50% of a total transverse extent of at least one flank of the main body from the cutting edge towards a rear side of the main body, the rear side facing away from the saw teeth.

19 Claims, 5 Drawing Sheets

(58) Field of Classification Search
CPC . B23D 65/00; Y10T 83/9319; Y10T 83/9346; Y10T 83/935; Y10T 83/936; Y10T 83/9358
See application file for complete search history.

(56) References Cited

U.S. PATENT DOCUMENTS

| | | | | |
|---|---|---|---|---|
| 1,369,178 A * | 2/1921 | Lawrence | ............ | B23D 61/121 76/112 |
| 1,463,880 A * | 8/1923 | Evans | ................. | B23D 61/121 76/112 |
| 1,566,880 A * | 12/1925 | Kelley | ................. | B23D 61/121 83/852 |
| 1,676,071 A * | 7/1928 | Bolinder | .............. | B23D 61/123 83/854 |
| 1,752,586 A * | 4/1930 | Bolinder | .............. | B23D 61/123 407/120 |
| 3,213,910 A | 10/1965 | Sweet | | |
| 5,119,708 A * | 6/1992 | Musgrove | ............ | B23D 61/128 83/835 |
| 2002/0121023 A1* | 9/2002 | Kocher | ................. | B23D 65/00 30/357 |
| 2013/0269499 A1* | 10/2013 | Bozic | ................... | B23D 61/025 83/697 |
| 2014/0366388 A1* | 12/2014 | Green | ................... | B23D 49/10 30/351 |
| 2018/0071847 A1 | 3/2018 | Kazda et al. | | |

FOREIGN PATENT DOCUMENTS

| | | | | |
|---|---|---|---|---|
| DE | 299 14 569 U1 | 12/1999 | | |
| DE | 10 2005 056 177 A1 | 6/2006 | | |
| DE | 20 2012 011 311 U1 | 1/2013 | | |
| DE | 10 2011 089 110 A1 | 6/2013 | | |
| DE | 10 2012 206 250 A1 | 10/2013 | | |
| DE | 10 2015 104 702 A1 | 9/2016 | | |
| EP | 2 110 194 A2 | 10/2009 | | |
| EP | 2714346 B1 * | 5/2017 | .......... | B23D 61/006 |
| FR | 1169494 A * | 3/1957 | | |
| FR | 2 216 052 A1 | 8/1974 | | |
| GB | 2 179 593 A | 3/1987 | | |
| GB | 2439291 A * | 12/2007 | .......... | B23D 61/123 |
| JP | 2013-255963 A | 12/2013 | | |
| TW | 201637758 A | 11/2016 | | |
| WO | 02/11934 A1 | 2/2002 | | |

OTHER PUBLICATIONS

International Search Report corresponding to PCT Application No. PCT/EP2019/080701, mailed Jan. 15, 2020 (German and English language document) (7 pages).

* cited by examiner

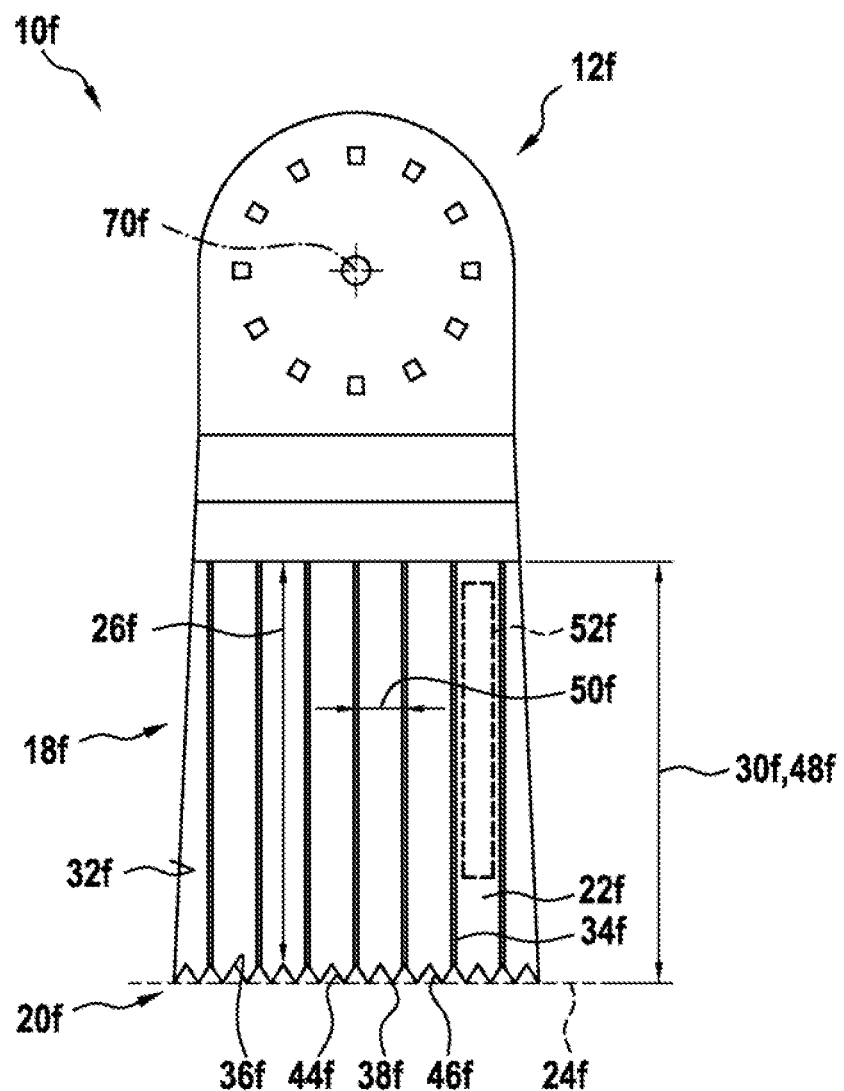

SAWING TOOL, IN PARTICULAR SAW BLADE

This application is a 35 U.S.C. § 371 National Stage Application of PCT/EP2019/080701, filed on Nov. 8, 2019, which claims the benefit of priority to Serial No. DE 10 2018 219 441.6, filed on Nov. 14, 2018 in Germany, the disclosures of which are incorporated herein by reference in their entirety.

BACKGROUND

EP 2 714 346 B1 has already disclosed a sawing tool which has a connecting region for connecting to a tool receptacle of a portable power tool, a main body connected to the connecting region, a saw toothing arranged on the main body, and a multiplicity of grooves arranged on the main body, which have a main extent extending transversely to a cutting edge of the saw toothing.

SUMMARY

The disclosure proceeds from a sawing tool, in particular from a saw blade, having at least one connecting region, in particular a shank, for connecting to a tool receptacle of a portable power tool, having at least one main body, in particular a carrier, connected to, in particular formed integrally with, the connecting region, having at least one saw toothing arranged, in particular set, on the main body, and having a multiplicity of reduction grooves arranged on the main body, in particular introduced into the main body by material removal, said reduction grooves having a main extent extending transversely to a cutting edge of the saw toothing.

It is proposed that the reduction grooves extend, in particular starting from the cutting edge in the direction of a rear side, facing away from the saw toothing, of the main body, at least over more than 50% of a total transverse extent, in particular of a total height, of at least one flank of the main body. In particular, the reduction grooves extend, in particular starting from the cutting edge in the direction of the rear side of the main body, at least over more than 60%, preferably over more than 80%, preferentially over more than 90% of the total transverse extent of the at least one flank of the main body. Particularly preferably, the reduction grooves extend, in particular as seen in a direction extending at least substantially perpendicularly to the cutting edge and/or at least substantially perpendicularly to a longitudinal axis of the main body, over the total transverse extent of the at least one flank of the main body. The main extent of each individual reduction groove of the multiplicity of reduction grooves extends in particular at least substantially perpendicularly to the cutting edge and/or at least substantially perpendicularly to the longitudinal axis of the main body. The expression "substantially perpendicularly" is intended to define in particular an orientation of a direction relative to a reference direction, wherein the direction and the reference direction, in particular as seen in a plane, enclose an angle of 90° and the angle has a maximum deviation of in particular less than 8°, advantageously less than 5° and particularly advantageously less than 2°. It is also conceivable, however, for the reduction grooves each to have a main extent that extends at an angle to the cutting edge and/or to the longitudinal axis of the main body, in particular encloses an angle other than 90° with the cutting edge and/or the longitudinal axis of the main body, for example an angle from a range of values from 100° to 170° or the like.

Preferably, the reduction grooves each have an at least substantially parallel course relative to a plane of symmetry of the main body. In particular, a groove bottom of each particular reduction groove extends at least substantially parallel to the plane of symmetry of the main body. It is also conceivable, however, for the reduction grooves to at least partially have an inclined course relative to the plane of symmetry, in particular, at least in subregions, to enclose an angle from a range of values from 0° to 180° with the plane of symmetry. For example, it is conceivable for the reduction grooves, in particular each particular groove bottom of the reduction grooves, to have a roof-shaped course, for example to have an extreme point in the middle and to have an inclination relative to the plane of symmetry in peripheral regions, in particular toward the saw toothing and toward the rear side. Further configurations of a course of the reduction grooves, in particular of the groove bottom, that appeal appropriate to a person skilled in the art are likewise conceivable.

Preferably, the reduction grooves extend, in particular constantly, in a rectilinear manner, in particular starting from the cutting edge in the direction of the rear side, facing away from the saw toothing, of the main body. It is also conceivable, however, for the reduction grooves to have a different course than an, in particular, constant and rectilinear course, in particular starting from the cutting edge in the direction of the rear side, facing away from the saw toothing, of the main body, for example a zigzagging course, an undulating course, a meandering course, an arcuate course or the like, in particular as seen in a main extent plane of the sawing tool. Preferably, the reduction grooves have a continuous course, in particular starting from the cutting edge in the direction of the rear side, facing away from the saw toothing, of the main body. It is also conceivable, however, for the reduction grooves to have an interrupted course, in particular such that, starting from the cutting edge in the direction of the rear side, facing away from the saw toothing, of the main body, a plurality of groove subregions of an individual reduction groove are arranged on the at least one flank, such that a plurality of reduction grooves are arranged in series one after another, starting from the cutting edge in the direction of the rear side, facing away from the saw toothing, of the main body, on the at least one flank, or the like. Preferably, the reduction grooves are arranged in, in particular have been introduced into, a face defining the at least one flank.

The term "reduction groove" is intended to define in particular a recess or cutout arranged in particular in the main body. Preferably, the reduction grooves have been introduced into the main body by removal of material from the main body. It is also conceivable, however, for the reduction grooves to have been introduced into the main body by some other method that appears appropriate to a person skilled in the art, for example by embossing or the like. It is also conceivable for the reduction grooves, alternatively or additionally, to be arranged in the connecting region, in particular the shank, in particular to have been introduced into the connecting region. It is conceivable for the reduction grooves, in at least one exemplary embodiment of the sawing tool according to the disclosure, to be arranged only on the at least one flank. It is conceivable for the reduction grooves to be configured in an open manner on both sides or on one side, in particular along the main extent of the reduction grooves. For example, it is conceivable for the reduction grooves to be bordered, at least on one side of the reduction grooves, by, in particular individual, peripheral regions of the main body that extend transversely to the main extent of the reduction grooves, in particular on a side of the reduction grooves that faces the rear side. The peripheral regions of the main body that extend transversely to the main extent of the reduction grooves may have a rectilinear course, for example a course that extends at least substantially parallel to the rear side and/or to the longitudinal axis of the main body, an arcuate, in particular circular arcuate, course, a zigzagging course, or some other course that appears appropriate to a person skilled in the art. The peripheral regions of the main body that extend transversely to the main extent of the reduction grooves are configured preferably as groove bordering edges of the main body. Preferably, the peripheral regions of the main body that extend transversely to the main extent of the reduction grooves, in particular the groove bordering edges, are configured differently than edges of the saw toothing, which border saw teeth of the saw toothing.

The reduction grooves may, in particular as seen along the longitudinal axis of the main body, be arranged in a manner distributed, in particular regularly or irregularly, over an entire face of the at least one flank. Preferably, the reduction grooves arranged on the at least one flank are distributed regularly on the at least one flank, in particular as seen along the longitudinal axis of the main body. Preferably, the reduction grooves that are arranged on the at least one flank all have an at least substantially analogous configuration. It is also conceivable, however, for the reduction grooves that are arranged on the at least one flank to have different configurations, for example different maximum main extents, different maximum transverse extents, different configurations as regards open sides the reduction grooves, different configurations as regards a course of the reduction grooves (rectilinear course, zigzagging course, undulating course, meandering course, arcuate course, interrupted course or the like) or some other different configuration of the reduction grooves that appears appropriate to a person skilled in the art. The reduction grooves may be arranged on the main body, in particular on the at least one flank and/or on the at least one further flank of the main body, with a constant or a non-constant spacing.

The sawing tool may be configured as a jigsaw blade, as a reciprocating saw blade or as a multifunctional-tool saw blade, in particular as what is known as an OMT saw blade (oscillation multi-tool saw blade). The longitudinal axis of the main body extends preferably at least substantially parallel to a plane comprising or defining the rear side and/or to the cutting edge, in particular when the sawing tool is configured as a jigsaw blade or as a reciprocating saw blade. The expression "substantially parallel" should be understood here as meaning in particular an orientation of a direction relative to a reference direction, in particular in a plane, wherein the direction exhibits a deviation in particular less than 8°, advantageously less than 5° and particularly advantageously less than 2° with respect to the reference direction. In at least one exemplary embodiment, in particular when the sawing tool is configured as a jigsaw blade or as a reciprocating saw blade, the cutting edge extends at an angle to the rear side, in particular to the plane comprising or defining the rear side, and/or to the longitudinal axis of the main body. It is conceivable for the rear side, in at least one configuration of the sawing tool, to have different angled regions that extend at an angle to the longitudinal axis. The expression "extend at an angle" should be understood as meaning in particular a course of an axis, in particular of an axis defining the cutting edge, relative to a further axis and/or to a plane, wherein the axis and the further axis and/or the plane enclose an angle, in particular an angle from an angular range from 0.1° to 90°. Preferably, the angled course of the cutting edge relative to the longitudinal axis of the main body is able to realized, as seen along the longitudinal axis of the main body, by different tooth flank lengths of saw teeth of the saw toothing or by a constant tooth flank length of saw teeth of the saw toothing and different maximum main extents of the reduction grooves.

The main body is preferably fixed to the connecting region by means of a force-fitting, form-fitting and/or materially bonded connection, for example by means of a welded connection, by means of an embossed connection, by means of an adhesive connection, by means of a toothing or the like. The connecting region is preferably in the form of a shank, in particular when the sawing tool is configured as a jigsaw blade or as a reciprocating saw blade, or of a form-fitting connection region into which a tool receptacle of a portable power tool is at least partially introducible, in particular when the sawing tool is configured as an OMT saw blade. In at least one configuration, in particular when the sawing tool is configured as a jigsaw blade or as a reciprocating saw blade, the connecting region, in particular the shank, is formed preferably integrally with the main body. The term "integrally" should be understood as meaning in particular formed in one piece. Preferably, this one piece is formed from a single blank, a mass and/or a molding, particularly preferably in an injection-molding process, in particular a single- and/or multi-component injection-molding process.

By means of the configuration according to the disclosure, a sawing tool having a low overall weight can advantageously be realized, in particular a sawing tool that is light compared with a sawing tool without reduction grooves. Advantageously, a sawing tool can be realized which allows a low power consumption of an, in particular battery-operated, portable power tool, in particular as a result of a low total mass of the sawing tool that is to be moved by the, in particular battery-operated, portable power tool. In particular as a result of the configuration of the reduction grooves, advantageous chip removal can be realized during machining of a workpiece. Advantageously, a small friction surface of the sawing tool can be realized, this advantageously having a positive effect on a machining surface of a workpiece, since, as a result of a low risk of chip dust being trapped between the sawing tool and the workpiece, little in the way of burn marks can remain on the workpiece. Advantageously, a small cutting-edge width of the sawing tool can be realized, with the result that, advantageously, a low required cutting and/or feed force can be realized, this in turn meaning a lower power requirement. Advantageously, easy guiding for curved cuts can be realized.

It is furthermore proposed that the main body has at least one web bordering at least one of the reduction grooves, said web extending, in particular starting from a saw-tooth root of the saw toothing in the direction of the rear side, at least over more than 50% of the total transverse extent of the at least one flank of the main body. In particular, the web extends, in particular starting from the saw-tooth root of the saw toothing in the direction of the rear side of the main body, at least over more than 60%, preferably over more than 80%, preferentially over more than 90% of the total transverse extent of the at least one flank of the main body. Particularly preferably, the web extends, in particular as seen in the direction extending at least substantially perpendicularly to the cutting edge and/or at least substantially perpendicularly to the longitudinal axis of the main body, entirely over the total transverse extent of the at least one flank of the main body, wherein in particular the saw toothing is configured in a web-free manner. A main extent of the web extends in particular at least substantially perpendicularly to the cutting edge and/or at least substantially perpendicularly to the longitudinal axis of the main body. Preferably, the web extends, in particular constantly, in a rectilinear manner, in particular starting from the saw-tooth root of the saw toothing in the direction of the rear side, facing away from the saw toothing, of the main body. It is also conceivable, however, for the web to have a course that differs from an, in particular constant, rectilinear course, in particular starting from the saw-tooth root of the saw toothing in the direction of the rear side, facing away from the saw toothing, of the main body, for example a zigzagging course, an undulating course, a meandering course, an arcuate course or the like, in particular as seen in the main extent plane of the sawing tool. Preferably, the web has a continuous course, in particular starting from the saw-tooth root of the saw toothing in the direction of the rear side, facing away from the saw toothing, of the main body. It is also conceivable, however, for the web to have an interrupted course, in particular such that, starting from the saw-tooth root of the saw toothing in the direction of the rear side, facing away from the saw toothing, of the main body, a plurality of web regions of the web are arranged on the at least one flank, such that a plurality of webs are arranged in series one after another, starting from the saw-tooth root of the saw toothing in the direction of the rear side, facing away from the saw toothing, of the main body, on the at least one flank, or the like. Preferably, in particular in each case, one web of the main body borders reduction grooves that are directly adjacent to one another. Preferably, as seen along the longitudinal axis of the main body, a web and a reduction groove are arranged alternately on the at least one flank, in particular starting from the connecting region in the direction of a tip of the sawing tool. The tip of the sawing tool is arranged on the main body, in particular formed integrally therewith, preferably at an end, facing away from the connecting region, of the main body, in particular when the sawing tool is configured as a jigsaw blade or as a reciprocating saw blade. Preferably, the main body comprises a multiplicity of webs, wherein a web is arranged preferably between two reduction grooves, in particular as seen along the longitudinal axis of the main body. It is conceivable for the webs to be arranged only on the at least one flank or for the webs to be arranged on the at least one flank and on at least one further flank of the main body. When the webs are arranged on the flank and on the further flank of the main body, it is conceivable in particular for the webs that are arranged on the at least one flank to be arranged in a manner aligned with the webs that are arranged on the further flank, or for the webs that are arranged on the at least one flank, in particular as seen along the longitudinal axis of the main body, to be arranged in an offset manner relative to the webs that are arranged on the further flank. By means of the configuration according to the disclosure, high stability of the sawing tool can advantageously be achieved, in particular in the case of low material usage of the sawing tool. Advantageously, the webs reinforce the sawing tool. By way of the webs of the main body, advantageously a good balance can be realized between weight reduction, in particular caused by the reduction grooves, and stability of the sawing tool. Advantageously, as a result of the arrangement of the at least one web, in particular of the webs, a small contact area of the sawing tool between a workpiece and the main body can be achieved during an operation of machining the workpiece. Advantageously, a small friction surface of the sawing tool can be realized, this advantageously having a positive effect on a machining surface of a workpiece, since, as a result of a low risk of chip dust being trapped between the sawing tool and the workpiece, little in the way of burn marks can remain on the workpiece. Advantageously, a small cutting-edge width of the sawing tool can be realized, with the result that, advantageously, a low required cutting and/or feed force can be realized, this in turn meaning a lower power requirement.

It is furthermore proposed that the main body has at least one web, in particular the abovementioned web, bordering at least one of the reduction grooves, said web being arranged on the main body in a manner set back with regard to a tooth tip of the saw toothing, in the direction of the flank. Preferably, the web exhibits a maximum spacing relative to a plane of symmetry of the main body which is smaller than a maximum spacing of the tooth tip of the saw toothing relative to the plane of symmetry of the main body. Preferably, all the webs of the main body exhibit a maximum spacing relative to a plane of symmetry of the main body which is smaller than a maximum spacing of all the tooth tips of the saw toothing relative to the plane of symmetry of the main body. It is also conceivable, however, for at least one web of the main body to exhibit a greater maximum spacing relative to the plane of symmetry than a maximum spacing of at least one tooth tip of the saw toothing. Preferably, the plane of symmetry extends substantially perpendicularly to the plane that comprises or defines the rear side of the main body. Preferably, the plane of symmetry of the main body extends at least substantially parallel to the course of the main extent of the reduction grooves and/or of the web(s) of the main body. Preferably, all of the webs of the main body are arranged on the main body in a manner set back with regard to the tooth tips of the saw toothing, in the direction of the flank. Preferably, the saw toothing is formed differently than a serrated edge. Preferably, the saw toothing is configured as a set saw toothing. It is also conceivable, however, for the saw toothing to have some other configuration that appears appropriate to a person skilled in the art and is in particular different than a serrated edge, for example a configuration as a milled and ground saw toothing, as a cross-ground saw toothing, as a riff saw toothing, as a knife saw toothing, as an undulating flat grind with a spacing, in particular independent of a spacing of the reduction grooves, or the like. The saw toothing can be configured in a manner introduced directly into the main body, in particular by milling, grinding or the like, or the saw toothing is configured as a strip of saw teeth which is arranged on the main body by means of a materially bonded connection. It is also conceivable for the saw toothing to have a particle tipping, for example a diamond particle or corundum particle tipping or the like. The saw toothing can be formed from a material that is different than the material of the main body, or the saw toothing is formed from the same material as the main body. The saw toothing can be formed from an HCS (High Carbon Steel), from a bimetal, from a hard metal or a combination of materials. The saw toothing can be arranged on one side or on both sides of the main body. Preferably, a clearance of the sawing tool is realized by setting individual saw teeth of the saw toothing. By means of the configuration according to the disclosure, it is advantageously possible, by way of the arrangement of the at least one web, in particular of the webs, to achieve a small contact area of the sawing tool between a workpiece and the main body during an operation of machining the workpiece. Advantageously, a clearance can be realized by means of the saw toothing, this contributing in particular to a low power consumption of an, in particular battery-operated, portable power tool advantageously being able to be allowed, in particular as a result of a small contact area between a workpiece and the sawing tool.

In addition, it is proposed that the reduction grooves are arranged on both sides of the main body, wherein reduction grooves are arranged on the flank and further reduction grooves are arranged on a further flank, in particular the abovementioned flank, of the main body. Given an arrangement of the reduction grooves on the flank and the further flank of the main body, it is conceivable in particular for the reduction grooves that are arranged on the at least one flank to be arranged in a manner aligned with the further reduction grooves that are arranged on the further flank. By means of the configuration according to the disclosure, high stability of the sawing tool can advantageously be achieved, in particular in the case of low material usage of the sawing tool. As a result of the reduction grooves being arranged on both sides of the main body, advantageously a good balance can be realized between weight reduction, in particular caused by the reduction grooves, and stability, in particular caused by the webs, of the sawing tool. Advantageously, a sawing tool can be realized which allows a low power consumption of an, in particular battery-operated, portable power tool, in particular as a result of a low total mass of the sawing tool that is to be moved by the, in particular battery-operated, portable power tool.

Furthermore, in particular in at least one exemplary embodiment, it is proposed that the reduction grooves on the flank are arranged in an offset manner relative to the further reduction grooves on the further flank. Preferably, the reduction grooves that are arranged on the at least one flank, as seen along the longitudinal axis of the main body, are arranged in an offset manner relative to the further reduction grooves that are arranged on the further flank. By means of the configuration according to the disclosure, high stability of the sawing tool can advantageously be achieved, in particular in the case of low material usage of the sawing tool. As a result of the reduction grooves being arranged on both sides of the main body, advantageously a good balance can be realized between weight reduction, in particular caused by the reduction grooves, and stability, in particular caused by the webs, of the sawing tool.

Furthermore, it is proposed that at least two saw teeth of the saw toothing are assigned to one of the reduction grooves. It is also conceivable, however, for a number of saw teeth of the saw toothing other than two to be assigned to one of the reduction grooves, for example a single saw tooth that is assigned to one of the reduction grooves, more than two saw teeth of the saw toothing, in particular three, four, five or more saw teeth that are assigned to one of the reduction grooves, or the like. Preferably, a tooth flank of a saw tooth of the saw toothing or tooth flanks of the saw teeth of the saw toothing transition(s) directly into the reduction groove assigned to the saw tooth or the saw teeth, in particular in a groove bottom of the reduction groove. It is also conceivable, however, for a step, a web, a material cutout or the like to be arranged between the tooth flank of the particular saw tooth and the reduction groove assigned to the saw tooth. By means of the configuration according to the disclosure, a sawing tool having a low overall weight can advantageously be realized, in particular a sawing tool that is light compared with a sawing tool without reduction grooves. Advantageously, a good balance can be realized between weight reduction, in particular caused by the reduction grooves, and stability, in particular caused by the assignment of the saw teeth to corresponding reduction grooves, of the sawing tool.

In addition, it is proposed that the reduction grooves, as seen along a longitudinal extent of the main body, have different maximum main extents. The longitudinal extent of the main body extends preferably at least substantially parallel to the longitudinal axis of the main body. Preferably, the longitudinal extent of the main body extends at least substantially parallel to or in the plane of symmetry of the main body. Preferably, a maximum main extent of an individual reduction groove extends, starting from a tooth root or a tooth tip of a saw tooth of the saw toothing, as far as an edge, bordering the rear side, of the at least one flank of the main body or as far as the peripheral region extending transversely to the main extent of the reduction groove, in particular a groove bordering edge, of the main body, which borders the corresponding reduction groove. It is also conceivable, however, for the reduction grooves, as seen along the longitudinal extent of the main body, to have identical maximum main extents, in particular maximum main extents that are constant at least in terms of numerical value. By means of the configuration according to the disclosure, a total flank face can advantageously be used to form an arrangement of reduction grooves. Advantageously, the reduction grooves can be arranged and/or configured optimally with respect to a use purpose of the sawing tool. In particular, it is advantageously possible for example for reduction grooves with a small maximum main extent to be arranged in a region of the sawing tool that is heavily loaded during a machining operation, wherein reduction grooves with a large maximum main extent are arranged in a less heavily loaded region. A sawing tool having a low overall weight can advantageously be realized, in particular a sawing tool that is light compared with a sawing tool without reduction grooves. Advantageously, a good balance can be realized between weight reduction, in particular caused by the reduction grooves, and stability, in particular caused by the assignment of the saw teeth to corresponding reduction grooves, of the sawing tool.

Furthermore, it is proposed that the reduction grooves, as seen along a longitudinal extent of the main body, have different maximum transverse extents. Preferably, a maximum transverse extent of an individual reduction groove extends, starting from a web, bordering the reduction groove, of the main body as far as a further web, which is located closest along the longitudinal axis and likewise borders the reduction groove, of the main body. Preferably, a maximum transverse extent of an individual reduction groove corresponds to a maximum spacing of mutually facing edges of the web and of the further web in a direction extending at least substantially parallel to the longitudinal axis of the main body, wherein the web and the further web border the reduction groove. It is also conceivable, however, for the reduction grooves, as seen along the longitudinal extent of the main body, to have identical maximum transverse extents, in particular maximum transverse extents that are constant at least in terms of numerical value. By means of the configuration according to the disclosure, a total flank face can advantageously be used to form an arrangement of reduction grooves. Advantageously, the reduction grooves can be arranged and/or configured optimally with respect to a use purpose of the sawing tool. In particular, it is advantageously possible for example for reduction grooves with a small maximum transverse extent to be arranged in a region of the sawing tool that is heavily loaded during a machining operation, wherein reduction grooves with a large maximum transverse extent are arranged in a less heavily loaded region. A sawing tool having a low overall weight can advantageously be realized, in particular a sawing tool that is light compared with a sawing tool without reduction grooves. Advantageously, a good balance can be realized between weight reduction, in particular caused by the reduction grooves, and stability, in particular caused by the assignment of the saw teeth to corresponding reduction grooves, of the sawing tool.

In addition, it is proposed that the main body has at least one material-free region, in particular in addition to the reduction grooves. Preferably, the main body comprises a multiplicity of material-free regions. Preferably, the material-free regions are in the form of gaps in the main body. The material-free regions can be arranged in the reduction grooves or in a region of the main body into which the reduction grooves do not extend. By means of the configuration according to the disclosure, a sawing tool having a low overall weight can advantageously be realized, in particular a sawing tool that is light compared with a sawing tool without reduction grooves and without material-free regions. Advantageously, a sawing tool can be realized which allows a low power consumption of an, in particular battery-operated, portable power tool, in particular as a result of a low total mass of the sawing tool that is to be moved by the, in particular battery-operated, portable power tool.

Furthermore, a method for producing a sawing tool according to the disclosure is proposed. Preferably, in at least one method step, at least one reduction groove, in particular all the reduction grooves, is/are introduced as a result of a material-removing machining process, for example grinding, milling or the like. Preferably, in at least one method step, a material-free region, in particular a gap, a hole, a bore or the like, is introduced into the main body. Alternatively, it is also conceivable for the sawing tool to be produced by means of an additive process. By means of the configuration according to the disclosure, a sawing tool having a low overall weight can advantageously be produced, in particular a sawing tool that is light compared with a sawing tool without reduction grooves.

The sawing tool according to the disclosure and/or the method according to the disclosure is/are not intended to be limited to the above-described application and embodiment. In particular, the sawing tool according to the disclosure and/or the method according to the disclosure can have a number of individual elements, components and units, and method steps, that differs from a number mentioned herein in order to fulfill a mode of operation described herein. In addition, for the ranges of values specified in this disclosure, values that lie within the mentioned limits are also intended to be disclosed and considered to be usable as desired.

BRIEF DESCRIPTION OF THE DRAWINGS

Further advantages will become apparent from the following description of the drawing. In the drawing, six exemplary embodiments of the disclosure are illustrated. The drawing, the description and the claims contain numerous features in combination. A person skilled in the art will expediently also consider the features individually and combine them to form useful further combinations.

In the drawing:

FIG. 9 shows a plan view of an alternative sawing tool according to the disclosure in a schematic illustration.

DETAILED DESCRIPTION

Figure 1:
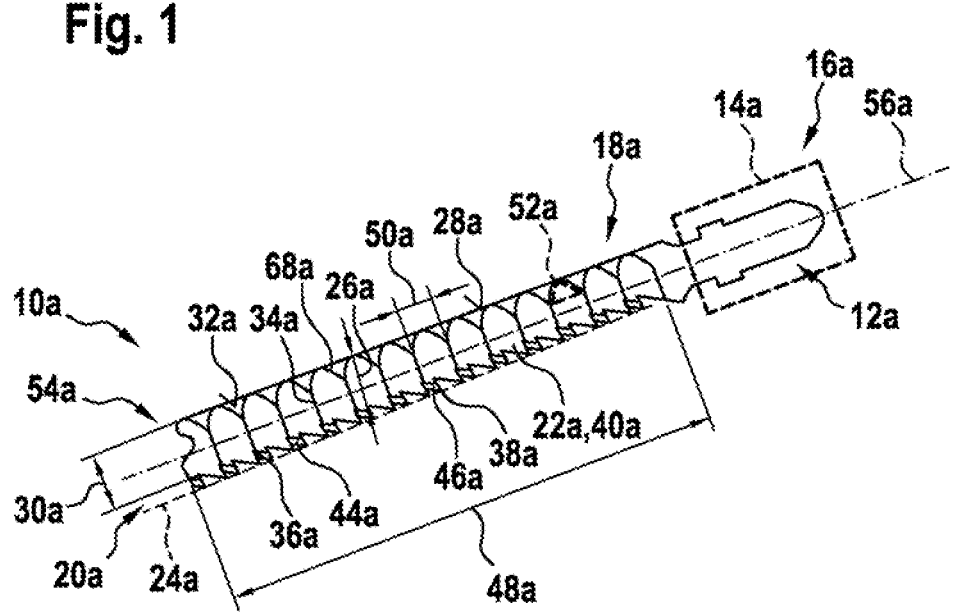
FIG. 1 shows a perspective view of a sawing tool according to the disclosure in a schematic illustration.

FIG. 1 shows a sawing tool 10a having at least one connecting region 12a for connecting to a tool receptacle 14a of a portable power tool 16a (only schematically illustrated), having at least one main body 18a connected to the connecting region 12a, having at least one saw toothing 20a arranged on the main body 18a, and having a multiplicity of reduction grooves 22a, 40a arranged on the main body 18a, said reduction grooves 22a, 40a having a main extent 26a extending transversely to a cutting edge 24a of the saw toothing 20a. The sawing tool 10a illustrated in figure is configured by way of example as a jigsaw blade. It also conceivable, however, for the sawing tool 10a to have some other configuration that appears appropriate to a person skilled in the art, for example a configuration as a reciprocating saw blade, as an OMT saw blade, or the like. The connecting region 12a is configured preferably as a shank, in particular as a shank, for example as a TO1 shank (Starrett), or the like. It is also conceivable, however, for the connecting region 12a configured as a shank to have some other configuration that appears appropriate to a person skilled in the art, for example a configuration as a TT1 shank, as a C shank, as an F shank, as an F shank, as an H shank, as an HSB shank, as an M shank, as an N shank, as a P shank, as an R shank, as an S shank, as a U shank, or the like. Preferably, the connecting region 12a is formed integrally with the main body 18a. It is also conceivable, however, for the connecting region 12a to be formed separately from the main body 18a and to be fixed to the main body 18a by means of a form-fitting and/or materially bonded connection.

The main body 18a has preferably a maximum longitudinal extent 48a that extends from a tip 54a of the main body 18a to the connecting region 12a, in particular the shank, in particular along a longitudinal axis 56a of the main body 18a. The tip 54a of the main body 18a has preferably an undulating shape, in particular as seen in a main extent plane of the sawing tool 10a.

The main body 18a is configured preferably as a carrier of the sawing tool 10a. The saw toothing 20a can have been introduced directly into the main body 18a, in particular by milling, grinding or the like, or the saw toothing 20a is configured as a strip of saw teeth, which is arranged on the main body 18a by means of a materially bonded connection. It is also conceivable for the saw toothing 20a to have a particle tipping, for example a diamond particle or corundum particle tipping or the like. The saw toothing 20a may be formed from a material that is different from the material of the main body 18a or the saw toothing 20a is formed from the same material as the main body 18a. Preferably, a cutting edge 24a of the saw toothing 20a extends at an angle to a rear side 28a of the main body 18a, in particular to a plane comprising or defining the rear side 28a, and/or to the longitudinal axis 56a of the main body 18a (cf. FIGS. 1 and 2). Preferably, the angled course of the cutting edge 24a relative to the longitudinal axis 56a of the main body 18a is able to be realized, as seen along the longitudinal axis 56a of the main body 18a, by different tooth flank lengths of saw teeth 44a, 46a of the saw toothing 20a or able to be realized by a constant tooth flank length of saw teeth 44a, 46a of the saw toothing 20a and different maximum main extents 26a of the reduction grooves 22a, 40a.

The reduction grooves 22a, 40a extend, in particular starting from the cutting edge 24a in the direction of the rear side 28a, facing away from the saw toothing 20a, of the main body 18a, at least over more than 50% of a total transverse extent 30a, in particular of a total height, of at least one flank 32a, 42a of the main body 18a. In particular, the reduction grooves 22a, 40a extend, in particular starting from the cutting edge 24a in the direction of the rear side 28a of the main body 18a, at least over more than 60%, preferably over more than 80%, preferentially over more than 90% of the total transverse extent 30a, in particular of the total height, of the at least one flank 32a, 42a of the main body 18a. Particularly preferably, the reduction grooves 22a, 40a extend, in particular as seen in a direction extending at least substantially perpendicularly to the cutting edge 24a and/or at least substantially perpendicularly to the longitudinal axis 56a of the main body 18a, entirely over the total transverse extent 30a, in particular the total height, of the at least one flank 32a of the main body 18a.

Preferably, the reduction grooves 22a, 40a extend, in particular constantly, in a rectilinear manner, in particular starting from the cutting edge 24a in the direction of the rear side 28a, facing away from the saw toothing 20a, of the main body 18a. It is also conceivable, however, for the reduction grooves 22a, 40a to have a course that differs from an, in particular constant, rectilinear course, in particular starting from the cutting edge 24a in the direction of the rear side 28a, facing away from the saw toothing 20a, of the main body 18a, for example a zigzagging course, an undulating course, a meandering course, an arcuate course, or the like, in particular as seen in the main extent plane of the sawing tool 10a. Preferably, the reduction grooves 22a, 40a have a continuous course, in particular starting from the cutting edge 24a in the direction of the rear side 28a, facing away from the saw toothing 20a, of the main body 18a. It is also conceivable, however, for the reduction grooves 22a, 40a to have an interrupted course, in particular such that, starting from the cutting edge 24a in the direction of the rear side 28a, facing away from the saw toothing 20a, of the main body 18a, a plurality of groove subregions are assigned to a single reduction groove 22a, 40a on the at least one flank 32a, 42a, such that a plurality of reduction grooves 22a, 40a are arranged in series one after another, starting from the cutting edge 24a in the direction of the rear side 28a, facing away from the saw toothing 20a, of the main body 18a, on the at least one flank 32a, 42a, or the like. Preferably, the reduction grooves 22a, 40a are arranged in, in particular have been introduced into, a face defining the at least one flank 32a, 42a.

Figure 2:
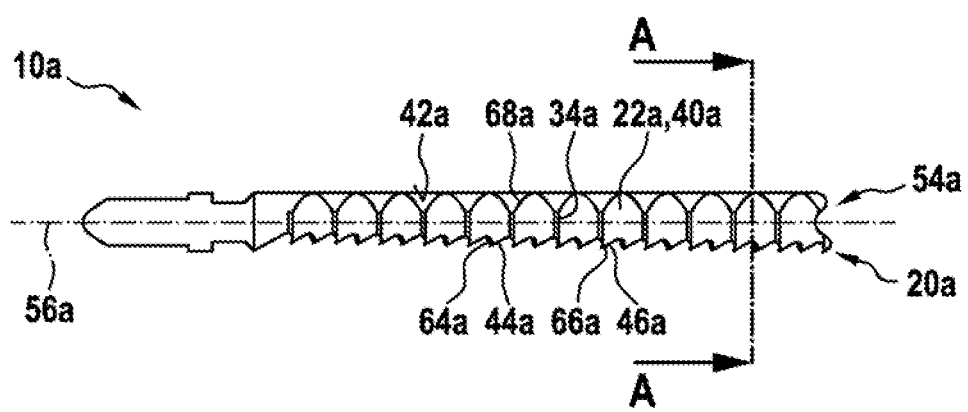
FIG. 2 shows a side view of the sawing tool according to the disclosure in a schematic illustration.

FIG. 2 shows a plan view of the sawing tool 10a, in particular of a further flank 42a of the main body 18a. The main body 18a comprises at least one web 34a bordering at least one of the reduction grooves 22a, 40a, said web 34a extending, in particular starting from a saw-tooth root 36a of the saw toothing 20a in the direction of the rear side 28a, at least over more than 50% of the total transverse extent 30a, in particular the entire height, of the at least one flank 32a or of the at least one further flank 42a of the main body 18a. The at least one flank 32a and the at least one further flank 42a form preferably side faces of the main body 18a. The at least one flank 32a and the at least one further flank 42a extend preferably from the saw toothing 20a to the rear side 28a. The saw toothing 20a can form a part of the at least one flank 32a and of the at least one further flank 42a.

In particular, the web 34a extends, in particular starting from a saw-tooth root 36a of the saw toothing 20a in the direction of the rear side 28a of the main body 18a, at least over more than 60%, preferably over more than 80%, preferentially over more than 90% of the total transverse extent 30a, in particular the total height, of the at least one flank 32a, 42a of the main body 18a. Particularly preferably, the web 34a extends, in particular as seen in the direction extending at least substantially perpendicularly to the cutting edge 24a and/or at least substantially perpendicularly to the longitudinal axis 56a of the main body 18a, entirely over the total transverse extent 30a, in particular the total height, of the at least one flank 32a, 42a of the main body 18a, wherein in particular the saw toothing 20a is formed in a web-free manner. A main extent of the web 34a extends in particular at least substantially perpendicularly to the cutting edge 24a and/or at least substantially perpendicularly to the longitudinal axis 56a of the main body 18a. Preferably, the web 34a extends, in particular constantly, in a rectilinear manner, in particular starting from the saw-tooth root 36a of the saw toothing 20a in the direction of the rear side 28a, facing away from the saw toothing 20a, of the main body 18a. It is also conceivable, however, for the web 34a to have a course that differs from an, in particular constant, rectilinear course, in particular starting from the saw-tooth root 36a of the saw toothing 20a in the direction of the rear side 28a, facing away from the saw toothing 20a, of the main body 18a, for example a zigzagging course, an undulating course, a meandering course, an arcuate course or the like, in particular as seen in the main extent plane of the sawing tool 10a. Preferably, the web 34a has a continuous course, in particular starting from the saw-tooth root 36a of the saw toothing 20a in the direction of the rear side 28a, facing away from the saw toothing 20a, of the main body 18a. It is also conceivable, however, for the web 34a to have an interrupted course, in particular such that, starting from the saw-tooth root 36a of the saw toothing 20a in the direction of the rear side 28a, facing away from the saw toothing 20a, of the main body 18a, a plurality of web regions of the web 34a are arranged on the at least one flank 32a, 42a, such that a plurality of webs 34a are arranged in series one after another, starting from the saw-tooth root 36a of the saw toothing 20a in the direct on of the rear side 28a, facing away from the saw toothing 20a, of the main body 18a, on the at least one flank 32a, 42a, or the like. Preferably, in particular in each case, one web 34a of the main body 18a borders reduction grooves 22a, 40a that are directly adjacent to one another. Preferably, as seen along the longitudinal axis 56a of the main body 18a, a web 34a and a reduction groove 22a, 40a are arranged alternately on the at least one flank 32a, 42a, in particular as seen from the connecting region 12a in the direction of the tip 54a of the sawing tool 10a.

Preferably, the main body 18a comprises a multiplicity of webs 34a, wherein a web 34a is arranged preferably between two reduction grooves 22a, 40a, in particular as seen along the longitudinal axis 56a of the main body 18a. It is conceivable for the webs 34a to be arranged only on the at least one flank 32a or for the webs 34a to be arranged on the at least one flank 32a and on the at least one further flank 42a of the main body 18a. When the webs 34a are arranged on the flank 32a and on the further flank 42a of the main body 18a, it is conceivable in particular for the webs 34a that are arranged on the at least one flank 32a to be arranged in a manner aligned with the webs 34a that are arranged on the further flank 42a, or for the webs 34a that are arranged on the at least one flank 32a, in particular as seen along the longitudinal axis 46a of the main body 18a, to be arranged in an offset manner relative to the webs 34a that are arranged on the further flank 42a (of FIG. 3).

Figure 3:
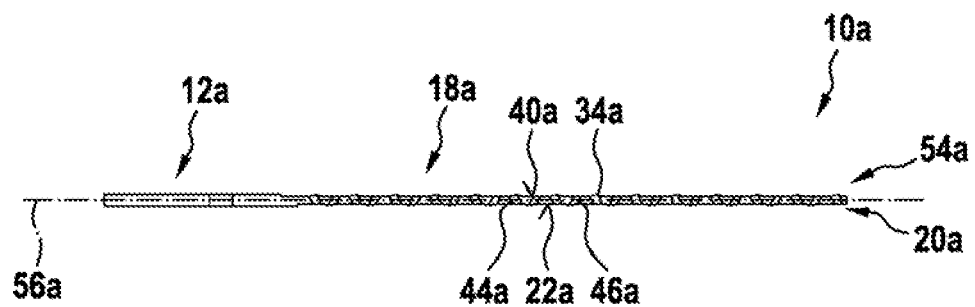
FIG. 3 shows a plan view of a saw toothing of the sawing tool according to the disclosure in a schematic illustration.

The reduction grooves 22a, 40a are arranged on both sides of the main body 18a, wherein reduction grooves 22a are arranged on the flank 32a and further reduction grooves 40a are arranged on the further flank 42a of the main body 18a (cf. FIG. 3). Preferably, given an arrangement of the reduction grooves 22a on the flank 32a and of the further reduction grooves 40a on the further flank 42a of the main body 18a, the reduction grooves 22a that are arranged on the at least one flank 32a are arranged in an offset manner relative to the further reduction grooves 40a that are arranged on the further flank 42a (cf. FIG. 3). The reduction grooves 22a on the flank 32a are preferably arranged in an offset manner relative to the further reduction grooves 40a on the further flank 42a. Given an arrangement of the reduction grooves 22a on the flank 32a and of the further reduction grooves 40a on the further flank 42a of the main body 18a, it is also conceivable for the reduction grooves 22a that are arranged on the at least one flank 32a to be arranged in a manner aligned with the further reduction grooves 40a that are arranged on the further flank 42a.

Preferably, the reduction grooves 22a, 40a, as seen along the longitudinal extent 48a of the main body 18a, have different maximum main extents 26a (cf. FIG. 2). The longitudinal extent 48a of the main body 18a extends preferably at least substantially parallel to the longitudinal axis 56a of the main body 18a. Preferably, the longitudinal extent 48a of the main body 18a extends at least substantially parallel to or in a plane of symmetry 60a of the main body 18a. Preferably, a maximum main extent 26a of an individual reduction groove 22a, 40a extends, starting from a saw-tooth root 36a or a tooth tip 38a of a saw tooth 44a, 46a of the saw toothing 20a, as far as an edge, bordering the rear side 28a, of the at least one flank 32a of the main body 18a or as far as a peripheral region 68a extending transversely to the main extent 26a of the reduction groove 22a, 40a, in particular a groove bordering edge, of the main body 18%, which borders the corresponding reduction groove 22a, 40a. The peripheral region 68a, in particular the groove bordering edge, of the main body 18a extends in an arcuate, in particular a circular arcuate manner. It is also conceivable, however, for the peripheral region 68a, in particular the groove bordering edge, of the main body 18a to have some other course that appears appropriate to a person skilled in the art. Preferably, the peripheral region 68a, in particular the groove bordering edge, of the main body 18a intersects an edge, bordering the rear side 28a, at at least one point. Preferably, the peripheral region 68a, in particular the groove bordering edge, of the main body 18a transitions directly into the rear side 28a. It is also conceivable, however, for the peripheral region 68a, in particular the groove bordering edge, of the main body 18a to be arranged in a spaced-apart manner relative to the rear side 28a, in particular to the edge, bordering the rear side 28a, of the main body 18a.

The reduction grooves 22a, 40a, as seen along the longitudinal extent 48a of the main body 18a, have different maximum transverse extents 50a. Preferably, a maximum transverse extent 50a of an individual reduction groove 22a, 40a extends, starting from the web 34a, bordering the reduction groove 22a, 40a, of the main body 18a as far as a further web 34a, which is located closest along the longitudinal axis 56a and likewise borders the reduction groove 22a, 40a, of the main body 18a. Preferably, a maximum transverse extent 50a of an individual reduction groove 22a, 40a corresponds to a maximum spacing of mutually facing edges of the web 34a and of the further web 34a in a direction extending at least substantially parallel to the longitudinal axis 56a of the main body 18a, wherein the web 34a and the further web 34a border the reduction groove 22, 34a. It is also conceivable, however, for the reduction grooves 22a, 34a, as seen along the longitudinal extent 48a of the main body 18a, to have identical maximum transverse extents 50a, in particular maximum transverse extents 50a that are constant at least in terms of numerical value.

In at least one exemplary embodiment, it is conceivable for the main body 18a to have at least one material-free region 52a (indicated only by dashed lines in FIG. 2), in particular in addition to the reduction grooves 22a, 40a. Preferably, the main body 18a could comprise a multiplicity of material-free regions 52a. Preferably, the material-free regions 52a could be configured as gaps in the main body 18a. The material-free regions 52a could be arranged in the reduction grooves 22a, 40a or in a region of the main body 18a into which the reduction grooves 22a, 40a do not extend.

Preferably, at least two saw teeth 44a, 46a of the saw toothing 20a are assigned to one of the reduction grooves 22a, 40a (cf. FIGS. 1 to 3). It is also conceivable, however, for a number of saw teeth 44a, 46a of the saw toothing 20a other than two to be assigned to one of the reduction grooves 22a, 40a, for example a single saw tooth 44a, 46a that is assigned to one of the reduction grooves 22a, 40a, more than two saw teeth 44a, 46a of the saw toothing 20a, in particular three, four, five or more saw teeth 44a, 46a that are assigned to one of the reduction grooves 22a, 40a, or the like. Preferably, a tooth flank 64a, 66a of a saw tooth 44a, 46a of the saw toothing 20a or tooth flanks 64a, 66a of the saw teeth 44a, 46a of the saw toothing 20a transition(s) directly into the reduction groove 22a, 40a assigned to the saw tooth 44a, 46a or the saw teeth 44a, 46a, in particular in a groove bottom of the reduction groove 22a, 40a (cf. FIG. 2). Preferably, the groove bottom of the reduction grooves 22a, 40a extends in an arcuate manner, in particular as seen in a plane extending at least substantially perpendicularly to the plane of symmetry 60a. It is also conceivable, however, for the groove bottom to have a polygonal course. It is also conceivable, however, for a step, a web, a material cutout or the like to be arranged between the tooth flank 64a, 66a of the particular saw tooth 44a, 46a and the reduction groove 22a, 40a assigned to the saw tooth 44a, 46a.

Figure 4:
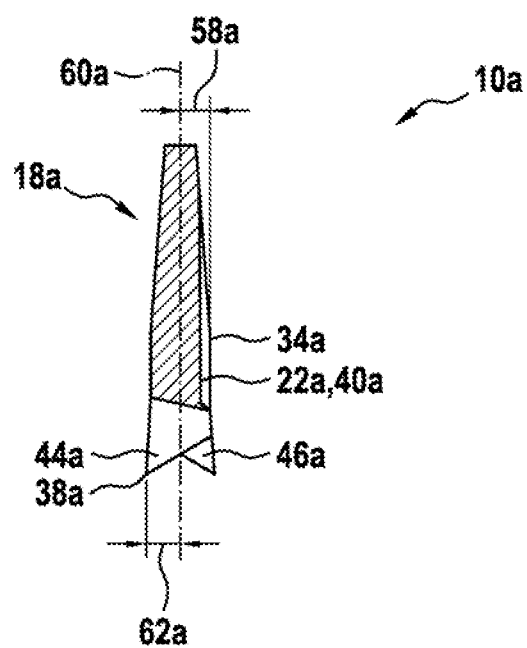
FIG. 4 shows a sectional view of the sawing tool according to the disclosure in a schematic illustration.

FIG. 4 shows a width of the main body in a sectional view on the line A-A in FIG. 2 with the depth of the reduction grooves 22a, 40a shown extending from the web 34a into the main body 18a. The main body 18a has at least the web 34a bordering at least one of the reduction grooves 22a, 40a, said web 34a being arranged on the main body 18a in a set back manner with regard to a tooth tip 38a of the saw toothing 20a, in the direction of the flank 32a, 42a. Preferably, the web 34a exhibits a maximum spacing 58a relative to the plane of symmetry 60a of the main body 18a which is smaller than a maximum spacing 62a of the tooth tip 38a of the saw toothing 20a relative to the plane of symmetry 60*a* of the main body 18*a*. Preferably, all the webs 34*a* of the main body 18*a* exhibit a maximum spacing 58*a* relative to the plane of symmetry 60*a* of the main body 18*a* which is smaller than a maximum spacing 62*a* of all the tooth tips 38*a* of the saw toothing 20*a* relative to the plane of symmetry 60*a* of the main body 18*a*. It is also conceivable, however, for at least one web 34*a* of the main body 18*a* to exhibit a greater maximum spacing 58*a* relative to the plane of symmetry 60*a* than a maximum spacing 62*a* of at least one tooth tip 38*a* of the saw toothing 20*a* relative to the plane of symmetry 60*a*. Preferably, the plane of symmetry 60*a* extends substantially perpendicularly to the plane that comprises or defines the rear side 28*a* of the main body 18*a*. Preferably, the plane of symmetry 60*a* of the main body 18*a* extends at least substantially parallel to the course of the main extent 26*a* of the reduction grooves 22*a*, 40*a* and/or of the web(s) 34*a* of the main body 18*a*. Preferably, all of the webs 34*a* of the main body 18*a* are arranged on the main body 18*a* in a manner set back with regard to the tooth tips 38*a* of the saw toothing 20*a*, in the direction of the flank 32*a*, 42*a*.

In a method for producing the sawing tool 10*a*, preferably in at least one method step, at least one of the reduction grooves 22*a*, 40*a*, in particular all of the reduction grooves 22*a*, 40*a*, is/are introduced into the main body 18*a* as a result of a material-removing machining process, for example grinding, milling or the like. Preferably, in at least one method step, the material-free region 52*a*, in particular a gap, a hole, a bore or the like, could be introduced into the main body 18*a*. Alternatively, it is also conceivable for the sawing tool 10*a* to be produced by means of an additive process.

FIGS. 5 to 9 each show a further exemplary embodiment of the disclosure. The following descriptions and the drawings are limited mainly to the differences between the exemplary embodiments, wherein, with regard to identically labeled components, in particular with regard to components with identical reference signs, reference may be made in principle also to the drawings and/or the description of the other exemplary embodiments, in particular FIGS. 1 to 4. In order to distinguish between the exemplary embodiments, the letter a is positioned after the reference signs of the exemplary embodiment in FIGS. 1 to 4. In the exemplary embodiments in FIGS. 5 to 9, the letter a is replaced by the letters b to f.

Figure 5:
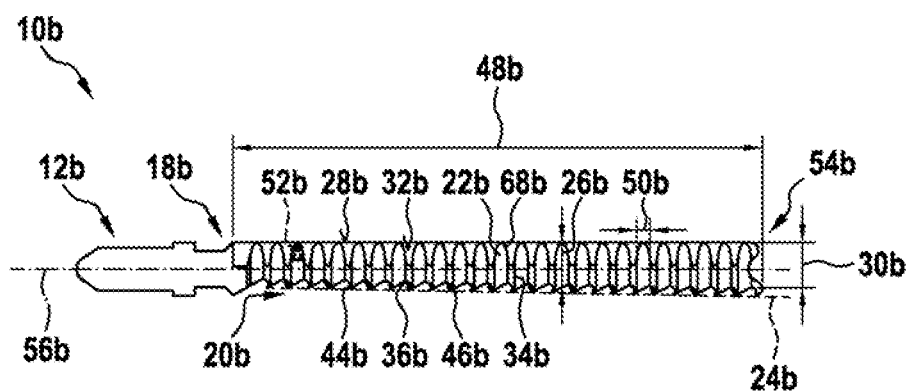
FIG. 5 shows a side view of an alternative sawing tool according to the disclosure in a schematic illustration.

FIG. 5 shows an alternative configuration of a sawing tool 10*b*. The sawing tool 10*b* comprises at least one connecting region 12*b* for connecting to a tool receptacle of a portable power tool (not illustrated in more detail here), at least one main body 18*b* connected to the connecting region 12*b*, at least one saw toothing 20*b* arranged on the main body 18*b*, and a multiplicity of reduction grooves 22*b* arranged on the main body 18*b*, said reduction grooves 22*b* having a main extent 26*b* extending transversely to a cutting edge 24*b* of the saw toothing 20*b*. The reduction grooves 22*b* extend, in particular starting from the cutting edge 24*b* in the direction of a rear side 28*b*, facing away from the saw soothing 20*b*, of the main body 18*b*, at least over more than 50% of a total transverse extent 30*b*, in particular a total height, of at least one flank 32*b* of the main body 18*b*. The sawing tool 10*b* illustrated in FIG. 5 has an at least substantially analogous configuration to the sawing tool 10*a* described in the description of FIGS. 1 to 4, and so, with regard to a configuration of the sawing tool 10*b* illustrated in FIG. 5, reference may be made at least substantially to the description of FIGS. 1 to 4. In contrast to the sawing tool 10*a* described in the description of FIGS. 1 to 4, the sawing tool 10*b* illustrated in FIG. 5 has the reduction grooves 22*b*, wherein in each case one saw tooth 44*b* of the saw toothing 20*b* is assigned to an individual reduction groove 22*b*.

Figure 6:
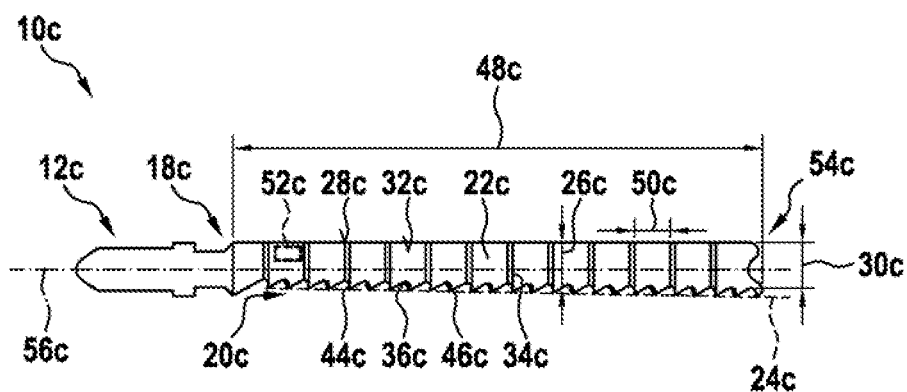
FIG. 6 shows a side view of a further alternative sawing tool according to the disclosure in a schematic illustration.

FIG. 6 shows a further alternative configuration of a sawing tool 10*c*. The sawing tool 10*c* comprises at least one connecting region 12*c* for connecting to a tool receptacle of a portable power tool (not illustrated in more detail here), at least one main body 18*c* connected to the connecting region 12*c*, at least one saw toothing 20*c* arranged on the main body 18*c*, and a multiplicity of reduction grooves 22*c* arranged on the main body 18*c*, said reduction grooves 22*c* having a main extent 26*c* extending transversely to a cutting edge 24*c* of the saw toothing 20*c*. The reduction grooves 22*c* extend, in particular starting from the cutting edge 24*c* in the direction of a rear side 26*c*, facing away from the saw toothing 20*c*, of the main body 18*c*, at least over more than 50% of a total transverse extent 30*c*, in particular a total height, of at least one flank 32*c* of the main body 18*c*. The sawing tool 10*c* illustrated in FIG. 6 has an at least substantially analogous configuration to the sawing tool 10*a* described in the description of FIGS. 1 to 4, and so, with regard to a configuration of the sawing tool 10*c* illustrated in FIG. 6, reference may be made at least substantially to the description of FIGS. 1 to 4. In contrast to the sawing tool 10*a* described in the description of FIGS. 1 to 4, the sawing tool 10*c* illustrated in FIG. 6 has the reduction grooves 22*c*, which, in particular starting from the cutting edge 24*c* in the direction of the rear side 28*c*, facing away from the saw toothing 20*c*, of the main body 18*c*, extend entirely over the total transverse extent 30*c* of the at least one flank 32*c* of the main body 18*c*. The reduction grooves 22*c* are configured in an open manner preferably on both sides. The reduction grooves 22*c* are formed in an open manner at an end facing the saw toothing 20*c*. The reduction grooves 22*c* are configured in an open manner at an end facing the rear side 28*c*.

Figure 7:
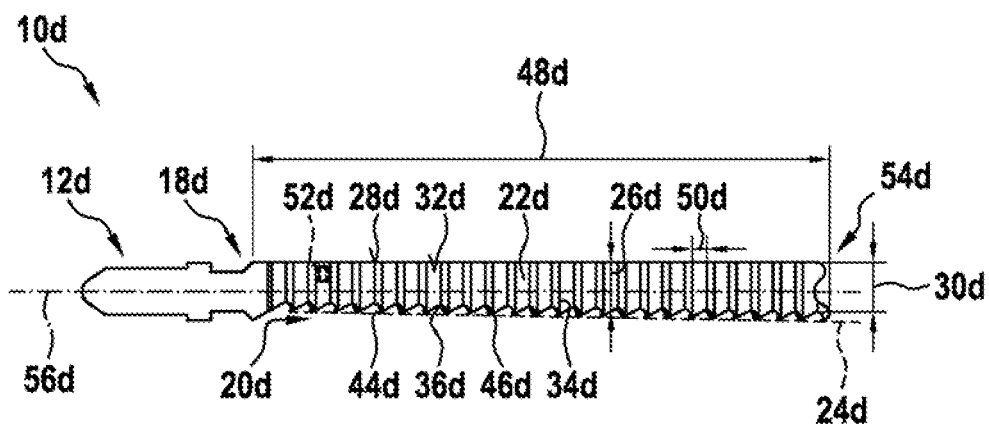
FIG. 7 shows a side view of an additional alternative sawing tool according to the disclosure in a schematic illustration.

FIG. 7 shows an additional further alternative configuration of a sawing tool 10*d*. The sawing tool 10*d* comprises at least one connecting region 12*d* for connecting to a tool receptacle of a portable power tool (not illustrated in more detail here), at least one main body 18*d* connected to the connecting region 12*d*, at least one saw toothing 20*d* arranged on the main body 18*d*, and a multiplicity of reduction grooves 22*d* arranged on the main body 18*d*, said reduction grooves 22*d* having a main extent 26*d* extending transversely to a cutting edge 24*d* of the saw toothing 20*d*. The reduction grooves 22*d* extend, in particular starting from the cutting edge 24*d* in the direction of a rear side 28*d*, facing away from the saw toothing 20*d*, of the main body 18*d*, at least over more than 50% of a total transverse extent 30*d*, in particular a total height, of at least one flank 32*d* of the main body 18*d*. The sawing tool 10*d* illustrated in FIG. 7 has an at least substantially analogous configuration to the sawing tool 10*a* described in the description of FIGS. 1 to 4, and so, with regard to a configuration of the sawing tool 10*d* illustrated in FIG. 7, reference may be made at least substantially to the description of FIGS. 1 to 4. In contrast to the sawing tool 10*a* described in the description of FIGS. 1 to 4, the sawing tool 10*d* illustrated in FIG. 7 has the reduction grooves 22*d*, wherein in each case one saw tooth 44*d* of the saw toothing 20*d* is assigned to an individual reduction groove 22*d*. The reduction grooves 22*d* extend, in particular starting from the cutting edge 24*d* in the direction of the rear side 28*d*, facing away from the saw toothing 20*d*, of the main body 18*d*, entirely over the total transverse extent 30*d* of the at least one flank 32*d* of the main body 18*d*. The reduction grooves 22*d* are configured in an open manner preferably on both sides. The reduction grooves 22*d* are configured in an open manner at an end facing the saw toothing 20d. The reduction grooves 22d are configured in an open manner at an end facing the rear side 28d.

Figure 8:
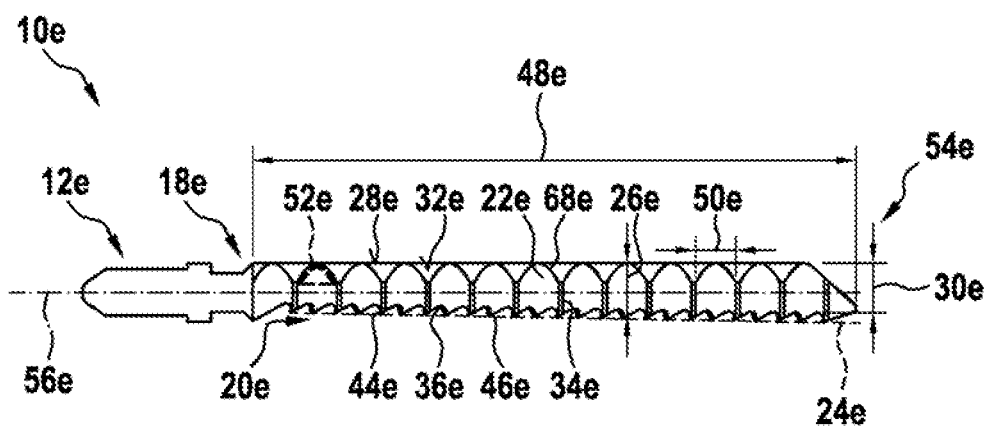
FIG. 8 shows a side view of a further additional alternative sawing tool according to the disclosure in a schematic illustration.

FIG. 8 shows an additional further alternative configuration of a sawing tool 10e. The sawing tool 10e comprises at least one connecting region 12e for connecting to a tool receptacle of a portable power tool (not illustrated in more detail here), at least one main body 18e connected to the connecting region 12e, at least one saw toothing 20e arranged on the main body 18e, and a multiplicity of reduction grooves 22e arranged on the main body 18e, said reduction grooves 22e having a main extent 26e extending transversely to a cutting edge 24e of the saw toothing 20e. The reduction grooves 22e extend, in particular starting from the cutting edge 24e in the direction of a rear side 28e, facing away from the saw toothing 20e, of the main body 18e, at least over more than 50% of a total transverse extent 30e, in particular a total height, of at least one flank 32e of the main body 18e. The sawing tool 10e illustrated in FIG. 8 has an at least substantially analogous configuration to the sawing tool 10a described in the description of FIGS. 1 to 4, and so, with regard to a configuration of the sawing tool 10e illustrated in FIG. 8, reference may be made at least substantially to the description of FIGS. 1 to 4. In contrast to the sawing tool 10a described in the description of FIGS. 1 to 4, the sawing tool 10e illustrated in FIG. 8 has the main body 18e, which has a triangular tip 54e.

FIG. 9 shows an alternative configuration of a sawing tool 10e. The sawing tool 10f comprises at least one connecting region 12f for connecting to a tool receptacle of a portable power tool (not illustrated in more detail here), at least one main body 18f connected to the connecting region 12f, at least one saw toothing 20f arranged on the main body 18f, and a multiplicity of reduction grooves 22f arranged on the main body 18f, said reduction grooves 22f having a main extent 26f extending transversely to a cutting edge 24f of the saw toothing 20f. The reduction grooves 22f extend, in particular starting from the cutting edge 24f in the direction of a rear side 28f, facing away from the saw toothing 20f, of the main body 18f, at least over more than 50% of a total transverse extent 30f, in particular a total height, of at least one flank 32f of the main body 18f. The sawing tool 10f illustrated in FIG. 9 has an at least substantially analogous configuration to the sawing tool 10a described in the description of FIGS. 1 to 4, and so, with regard to a configuration of the sawing tool 10f illustrated in FIG. 9, reference may be made at least substantially to the description of FIGS. 1 to 4. In contrast to the sawing tool 10a described in the description of FIGS. 1 to 4, the sawing tool 10f illustrated in FIG. 9 is configured as an OMT saw blade. The main body 18f has a polygonal shape. It is also conceivable, however, for the main body 18f to have a circular shape. The main body 18f has been fixed to the connecting region 12f by means of a form-fitting and/or materially bonded connection. The at least one flank 32f extends preferably transversely, in particular at least substantially perpendicularly, to a drive axis 70f of the sawing tool 10f. The at least one flank 32f is arranged preferably on a side, facing the connecting region 12f, of the main body 18f. The reduction grooves 22f extend preferably from the saw toothing 20f to the connecting region 12f. Preferably, a transverse extent of the flank 32f corresponds to a longitudinal extent 48f of the main body 18f.

The invention claimed is:

1. A sawing tool, comprising:
at least one connecting region configured to connect to a tool receptacle of a portable power tool; and
at least one main body connected to the at least one connecting region, said at least one main body having at least one saw toothing arranged on the at least one main body and having a multiplicity of reduction grooves arranged on the at least one main body, each of said multiplicity of reduction grooves having a respective main extent extending transversely to a cutting edge of the at least one saw toothing, wherein a width of the at least one main body at the multiplicity of reduction grooves is less than a width of the at least one main body at a location that is not at the multiplicity of reduction grooves, the multiplicity of reduction grooves extend in the direction of a rear side of the at least one main body facing away from the at least one saw toothing of the at least one main body at least over more than 50% of a total transverse extent of at least one flank of the at least one main body, each of the multiplicity of reduction grooves has a respective maximum transverse extent as seen along a longitudinal extent of the at least one main body, and a respective depth from the at least one flank toward an axis of symmetry of the at least one main body, the respective maximum transverse extent is greater than the respective depth, the at least one main body defines a first width at the rear side in a plane orthogonal to the longitudinal extent, the at least one main body defines a second width in the plane adjacent a portion of the multiplicity of reduction grooves distal to the at least one saw toothing, and the first width is less than the second width, the at least one main body includes at least one web portion having a minimum transverse extent, along the longitudinal extent of the main body, between adjacent ones of the multiplicity of reduction grooves, which is less than a respective maximum extent of the adjacent ones of the multiplicity of reduction grooves along the longitudinal extent of the at least one main body, the at least one saw toothing includes at least one tooth, the at least one tooth includes a tooth flank having an extent along the longitudinal extent, the minimum transverse extent of the at least one web is less than the extent of the tooth flank along the longitudinal extent; and the respective maximum extents of the adjacent ones of the multiplicity of reduction grooves are greater than the extent of the tooth flank along the longitudinal extent.

2. The sawing tool as claimed in claim 1, wherein said at least one web extends starting from a saw-tooth root of the at least one saw toothing in the direction of the straight rear side at least over more than 50% of the total transverse extent of the at least one flank of the at least one main body.

3. The sawing tool as claimed in claim 1, wherein:
said at least one saw toothing includes a plurality of teeth; and
said at least one web does not extend into any of the plurality of teeth.

4. The sawing tool as claimed in claim 1, wherein:
the at least one flank comprises a first flank on a first side of the at least one main body and a second flank on a second side of the at least one main body opposite the first side; and
the multiplicity of reduction grooves comprises a first plurality of reduction grooves arranged on the first flank and second plurality of reduction grooves arranged on the second flank.

5. The sawing tool as claimed in claim 4, wherein the first plurality of reduction grooves are not aligned with the second plurality of reduction grooves along the cutting edge.

6. The sawing tool as claimed in claim 1, wherein each of the multiplicity of reduction grooves is arranged between a respective pair of the at least one saw toothing and the rear side.

7. The sawing tool as claimed in claim 1, wherein the multiplicity of reduction grooves, as seen along the longitudinal extent of the at least one main body have different maximum main extents.

8. The sawing tool as claimed in claim 1, wherein the multiplicity of reduction grooves as seen along the longitudinal extent of the at least one main body have different maximum transverse extents.

9. The sawing tool as claimed in claim 1, wherein the at least one main body has at least one material-free region in addition to the multiplicity of reduction grooves.

10. The sawing tool as claimed in claim 1, wherein the sawing tool is a saw blade.

11. The sawing tool as claimed in claim 1, wherein the at least one connecting region includes a shank.

12. The sawing tool as claimed in claim 1, wherein the at least one main body is formed integrally with the connecting region.

13. The sawing tool as claimed in claim 1, wherein the multiplicity of reduction grooves arranged on the at least one main body are introduced into the at least one main body by material removal.

14. The sawing tool as claimed in claim 1, wherein the multiplicity of reduction grooves extend starting from the cutting edge directly in the direction of the straight rear side facing away from the at least one saw toothing of the at least one main body at least over more than 50% of the total transverse extent of the at least one flank of the at least one main body.

15. The sawing tool as claimed in claim 1, wherein none of the multiplicity of reduction grooves extend into any of the at least one saw toothing.

16. The sawing tool as claimed in claim 1, wherein each of said respective main extents extend transversely to the cutting edge of the at least one saw toothing at an angle of ninety degrees.

17. The sawing tool as claimed in claim 2, wherein:
said at least one web has an outer surface which is parallel to a plane of symmetry of the at least one main body;
a respective groove bottom of each of the multiplicity of reduction grooves is parallel to the plane of symmetry; and
the at least one flank extends from the at least one web to the rear side in a straight line.

18. A sawing tool, comprising:
a connecting region configured to connect to a tool receptacle of a portable power tool; and
a main body extending from the connecting region, said main body having
a longitudinal extent,
a saw toothing,
a rear side facing away from the saw toothing,
a plurality of reduction grooves, each of said plurality of reduction grooves having a respective main extent extending transversely to the saw toothing, and
at least one web portion having a minimum transverse extent, along the longitudinal extent of the main body, between adjacent ones of the plurality of reduction grooves, which is less than a respective maximum extent of the adjacent ones of the plurality of reduction grooves along the longitudinal extent of the main body,
wherein:
the main body defines a first width in a plane orthogonal to the longitudinal extent at the rear side,
the main body defines a second width in the plane and adjacent a portion of the plurality of reduction grooves distal to the saw toothing,
the first width is less than the second width,
the saw toothing includes at least one tooth,
the at least one tooth includes a tooth flank having an extent along the longitudinal extent,
the minimum transverse extent of the at least one web is less than the extent of the tooth flank along the longitudinal extent; and
the respective maximum extents of the adjacent ones of the plurality of reduction grooves are greater than the extent of the tooth flank along the longitudinal extent.

19. A sawing tool, comprising:
a connecting region configured to connect to a tool receptacle of a portable power tool; and
a main body extending from the connecting region, said main body having
a longitudinal extent,
a saw toothing,
a rear side facing away from the saw toothing,
a plurality of reduction grooves, each of said plurality of reduction grooves having a respective maximum main extent extending transversely to the saw toothing, and
at least one web portion having a minimum transverse extent, along the longitudinal extent of the main body, between adjacent ones of the plurality of reduction grooves, which is less than a respective maximum extent of the adjacent ones of the plurality of reduction grooves along the longitudinal extent,
wherein:
the saw toothing includes at least one tooth;
the at least one tooth includes a tooth flank having an extent along the longitudinal extent;
the minimum transverse extent of the at least one web is less than the extent of the tooth flank along the longitudinal extent; and
the respective maximum extents of the adjacent ones of the plurality of reduction grooves are greater than the extent of the tooth flank along the longitudinal extent.

* * * * *